United States Patent
Brown

(10) Patent No.: US 9,178,258 B1
(45) Date of Patent: Nov. 3, 2015

(54) SPLIT-BLOCK CONSTRUCTION OF WAVEGUIDE CHANNELS FOR RADAR FRONTEND

(71) Applicant: Google Inc., Mountain View, CA (US)

(72) Inventor: Adam Brown, Mountain View, CA (US)

(73) Assignee: Google Inc., Mountain View ( * ) Notice: Subject to any disclaimer, the term of this patent is extended or adjusted under 35 U.S.C. 154(b) by 203 days.

(21) Appl. No.: 13/866,410

(22) Filed: Apr. 19, 2013

(51) Int. Cl.
*H01P 3/00* (2006.01)
*H01P 3/12* (2006.01)
*H01P 11/00* (2006.01)

(52) U.S. Cl.
CPC ............... *H01P 3/12* (2013.01); *H01P 11/001* (2013.01)

(58) Field of Classification Search
None
See application file for complete search history.

(56) References Cited

U.S. PATENT DOCUMENTS

| | | | |
|---|---|---|---|
| 4,058,813 A | 11/1977 | Risko | |
| 4,480,336 A | 10/1984 | Wong | |
| 5,841,288 A * | 11/1998 | Meaney et al. | 324/639 |
| 6,323,818 B1 * | 11/2001 | Koh et al. | 343/786 |
| 7,961,153 B2 | 6/2011 | Haziza | |
| 2007/0249292 A1 * | 10/2007 | Mann et al. | 455/73 |
| 2009/0303147 A1 * | 12/2009 | Choudhury | 343/776 |
| 2010/0109820 A1 * | 5/2010 | Ko | 333/248 |

FOREIGN PATENT DOCUMENTS

CN  201210512 Y  3/2009

* cited by examiner

*Primary Examiner* — Cassandra Cox

(57) ABSTRACT

A radar system in an autonomous vehicle may be operated in various modes and with various configurations. The autonomous vehicle features a radar system having a waveguide with a first waveguide section, a second waveguide section, and a seam between the first and the second waveguide sections. The first waveguide section and the second waveguide section form a waveguide cavity. Additionally, the seam corresponds to a low surface current location of a propagation mode of the waveguide and is formed where the first waveguide section is coupled to the second waveguide section. The height of the first waveguide section may be equal to the height of the second waveguide section. The waveguide also may include a feed configured to introduce a wave with the propagation mode into the waveguide. Moreover, the waveguide may also include more than one cavity. Each cavity may lie on a plane defined by the seam.

18 Claims, 9 Drawing Sheets

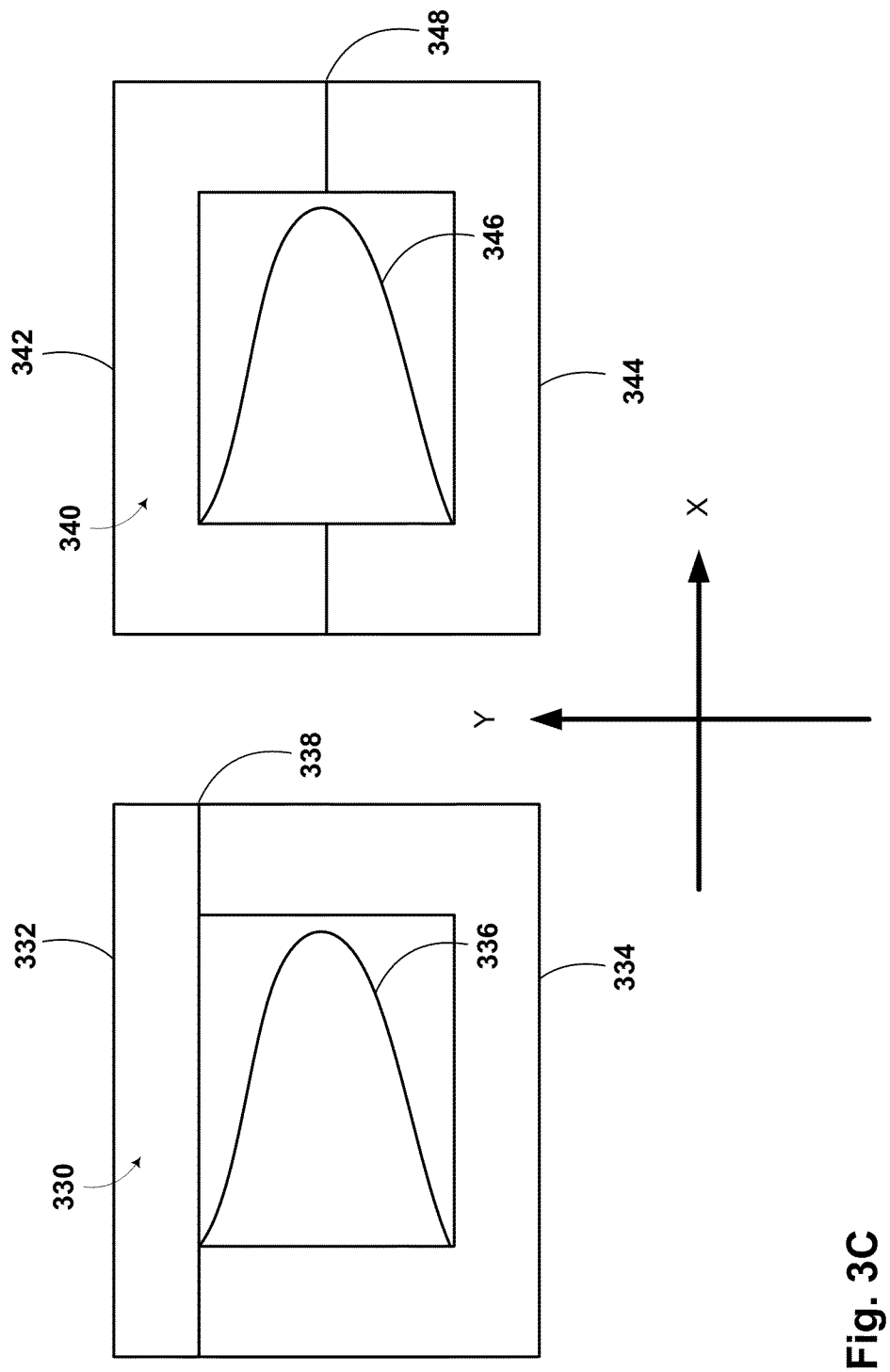

SPLIT-BLOCK CONSTRUCTION OF WAVEGUIDE CHANNELS FOR RADAR FRONTEND

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

In order to aid the vehicle control system, an autonomous vehicle includes a radar system. The radar system may be operated in various modes and with various configurations based on the intended use and operating conditions.

A first embodiment includes a waveguide having a first waveguide section, a second waveguide section, and a seam along the axis of propagation for conducted electromagnetic energy. The seam is located between the first waveguide section and the second waveguide section. The first waveguide section and the second waveguide section form a waveguide cavity. Additionally, the seam corresponds to a low surface current location of a propagation mode of the waveguide and is formed where the first waveguide section is coupled to the second waveguide section. In some situations, the propagation mode takes the form of one of a transverse electric propagation mode, or a transverse magnetic propagation mode.

In an example, the waveguide the first waveguide section and the second waveguide section each have a respective height. The height of the first waveguide section may be equal to the height of the second waveguide section. However, the height of the first waveguide section may also be equal to two times the height of the second waveguide section. In yet other configurations, the height of the first waveguide section may be equal to one half the height of the second waveguide section. The waveguide also may include a feed configured to inject or remove electromagnetic energy (i.e., an electromagnetic wave) with the propagation mode into or out of the waveguide cavity. Moreover, the waveguide may also include more than one cavity. Each cavity may lie on a plane defined by the seam.

Another embodiment features a method for creating a waveguide. The method includes determining both a mode of operation for a waveguide and a low-surface current location within the waveguide. The low-surface current location is based on both the mode of operation of the waveguide and a dimension of the waveguide. The method also includes creating a first waveguide section and a second waveguide section. After the first waveguide section and a second waveguide section are created, the method includes coupling the first waveguide section and the second waveguide section to form the waveguide. The dimension of the waveguide is such that the first waveguide section and second waveguide section are in contact at the low surface current location of the waveguide. In some situations, the propagation mode takes the form of one of a transverse electric propagation mode, or a transverse magnetic propagation mode. Further, the waveguide may have a dimension that is equal to the sum of the first waveguide section height and the second waveguide section height. The height of the first waveguide section may be equal to the height of the second waveguide section.

Yet another embodiment involves a method of operating a waveguide. The method includes receiving electromagnetic energy at the waveguide and conducting the electromagnetic energy through the waveguide. The electromagnetic energy is conducted in a mode. Additionally, the waveguide has a seam corresponding to a low current position of the mode. Further, the waveguide comprises a first waveguide second and a second waveguide section coupled together at the seam.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 3C illustrates two additional examples of modes operating in waveguides.

DETAILED DESCRIPTION

Figure 1:
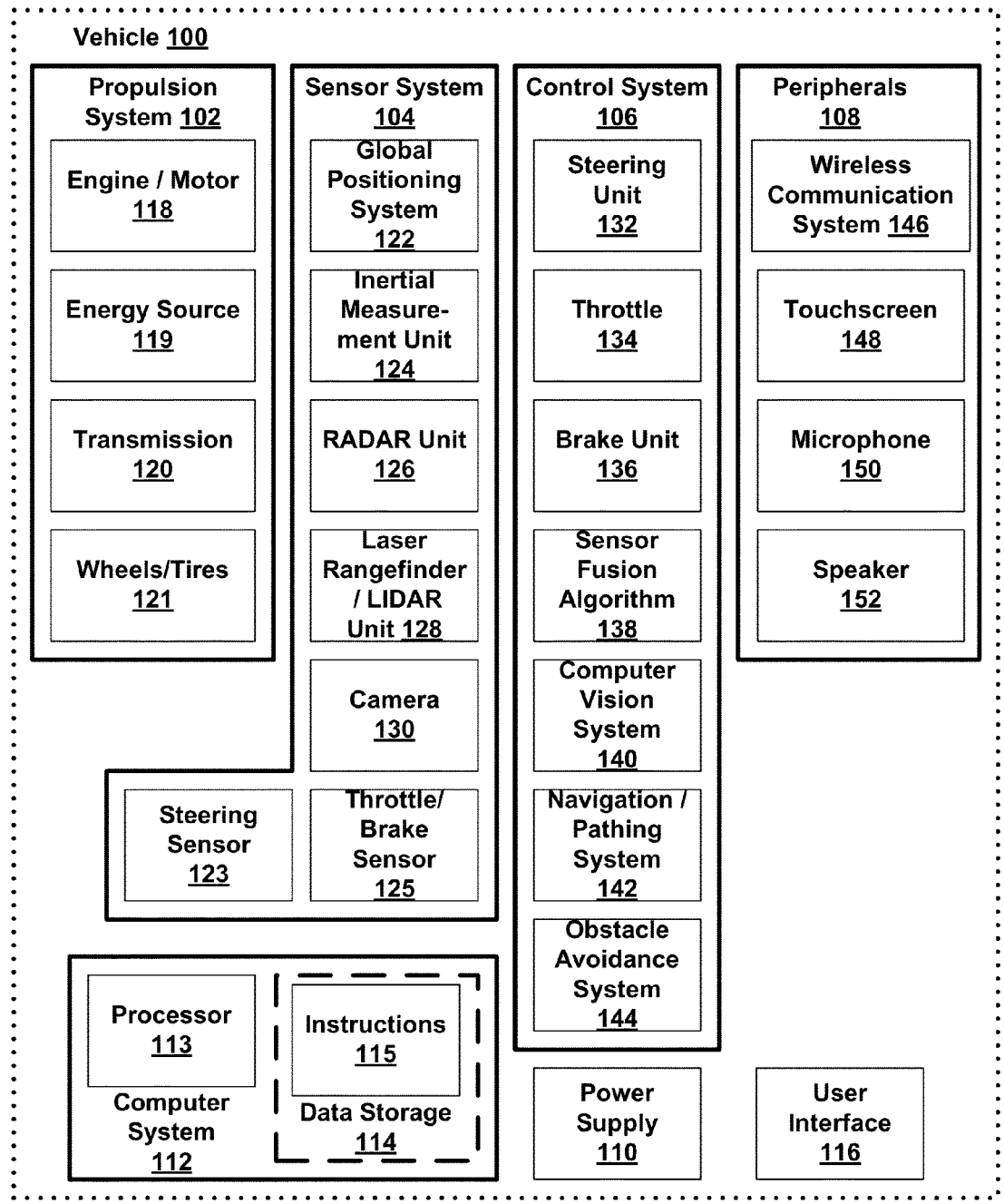
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

1. Overview

Example embodiments disclosed herein relate to a radar system having a waveguide feed. Further, the embodiments disclosed herein have a split-block construction that can decrease signal irregularities introduced by the waveguide.

A radar system of an autonomous vehicle may include a plurality of antennas. Each antenna may be configured to (i) transmit electromagnetic signals, (ii) receive electromagnetic signals, or (iii) both transmit and receive electromagnetic signals. The antennas may form an array of antenna elements. Each antenna of the array may be fed (i.e., supplied with a signal) from waveguide. Additionally, the waveguide may communicate signals received by the various antennas to a receiver within the radar system.

A waveguide is a structure that conducts electromagnetic energy from one location to another location. In some instances, conducting electromagnetic energy with a waveguide has the advantage of having less loss than other conduction means. A waveguide will typically have less loss than other conduction means because the electromagnetic energy is conducted through a very low loss medium. For example, the electromagnetic energy of a waveguide may be conducted through air or a low loss dielectric.

In one embodiment, such as an air-filled waveguide, the waveguide will have a metallic outer conductor. However, in other embodiments, the waveguide may be formed by just the dielectric medium through which the energy propagates. In in either embodiment, the size and shape of the waveguide define the propagation of the electromagnetic energy. For example, an electromagnetic energy may bounce (or reflect) off the metallic walls of waveguide. In other embodiments, a dielectric medium may fully contain the electromagnetic energy (such as fiber optic transmission).

Based on the shape and the materials of the waveguide, the propagation of the electromagnetic energy will vary. The shape and the materials of the waveguide define the boundary conditions for the electromagnetic energy. Boundary conditions are known conditions for the electromagnetic energy at the edges of the waveguide. For example, in the metallic waveguide, assuming the waveguide walls are nearly perfectly conducting, the boundary conditions require that there be no tangentially directed electric field at any of the wall sides. Once the boundary conditions are known, Maxwell's Equations can be used to determine how electromagnetic energy propagates through the waveguide.

Maxwell's Equations will define several modes of operation for any given waveguide. Each mode defines one specific way in which electromagnetic energy can propagate through the waveguide. Each mode has an associated cutoff frequency. A mode cannot exist in a waveguide if the electromagnetic energy has a frequency that is below the cutoff frequency. By properly selecting both (i) waveguide dimensions and (ii) frequency of operation, electromagnetic energy may propagate through the waveguide in a specific mode. Often, waveguides are designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the waveguide. However, a suffix number of zero indicates there is not a variation of the field with respect to that direction. For example, a $TE_{10}$ mode indicates the waveguide is a half-wavelength in width and there is no field variation in the height direction. Typically, when the suffix number is equal to zero, the dimension of the waveguide in the respective direction is less than one-half of a wavelength. In another example, a $TE_{21}$ mode indicates the waveguide is a one wavelength in width (i.e. two half wavelengths) and one half wavelength in height. Modes will be discussed further with respect to FIG. 3.

When operating a waveguide in a TE mode, the suffix numbers also indicate the number of field-maximums along the respective direction of the waveguide. For example, a $TE_{10}$ mode indicates the waveguide has one electric field maximum in the in width and there zero maxima in the height. In another example, a $TE_{21}$ mode the waveguide has two electric field maxima in the in width and one maximum in the height. At the point along the surface of the waveguide that corresponds to the position where the electric field is a maximum, the current induced in the waveguide is at a minimum. Thus, any disturbances in the waveguide at this low current point will have a minimal effect on the propagation of the electromagnetic energy. However, at the point along the surface of the waveguide that corresponds to the position where the electric field is a minimum, the current induced in the waveguide is at a maximum. Thus, any disturbances in the waveguide at this high current point may have a significant effect on the propagation of the electromagnetic energy.

2. Example Systems

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. For example, a computer system could control the vehicle 100 while in the autonomous mode, and may be operable to transmit a radio signal, receive reflected radio signals with at least one antenna in the radar system, process the received reflected radio signals, locate the objects that caused the reflections, and calculate an angle and a distance to each object that reflected the radio signal. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

The computer system 112 could carry out several determinations based on the indications received from the input- and output-indication sensors. For example, the computer system 112 could calculate the direction (i.e. angle) and distance (i.e.

range) to one or more objects that are reflecting radar signals back to the radar unit 126. Additionally, the computer system 112 could calculate a range of interest. The range of interest could, for example, correspond to a region where the computer system 112 has identified one or more targets of interest. Additionally or additionally, the computer system 112 may identify one or more undesirable targets. Thus, a range of interest may be calculated so as not to include undesirable targets.

In some embodiments, the computer system 112 may make a determination about various objects based on data that is provided by systems other than the radar system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
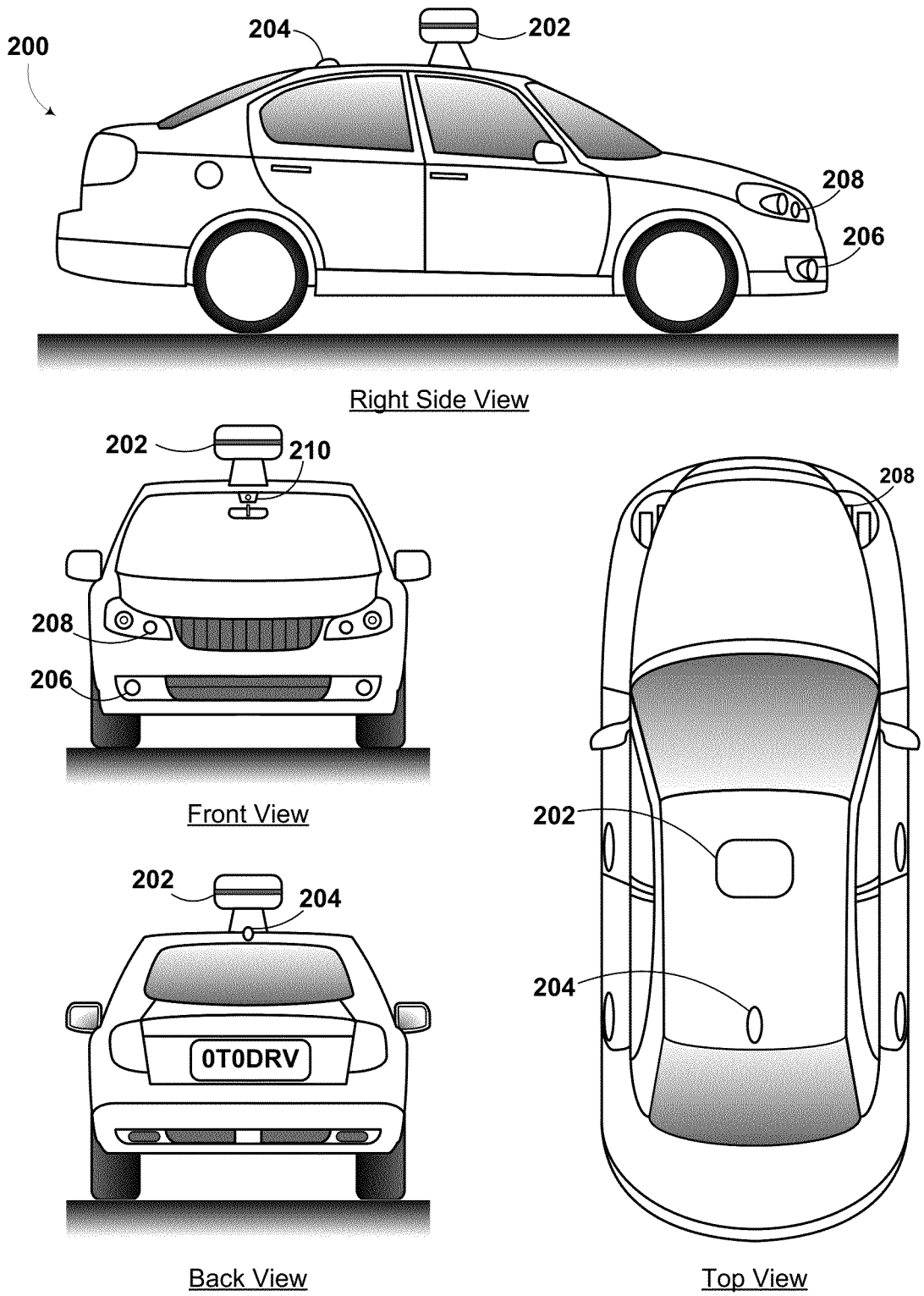
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a radar 206, a laser rangefinder 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radar 206 and laser rangefinder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3A:
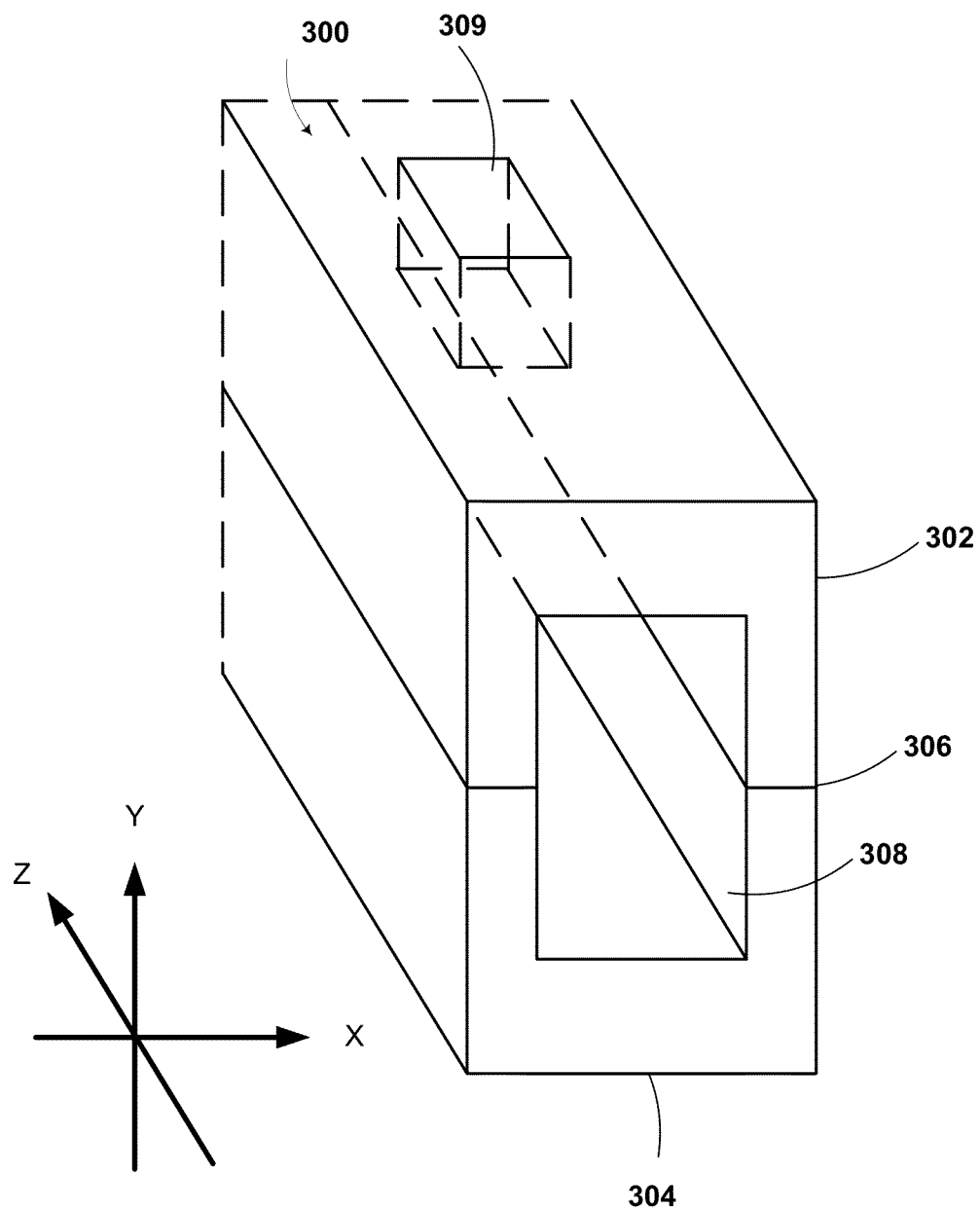
FIG. 3A illustrates an example isometric cross-section view of a waveguide.

FIG. 3A illustrates an example isometric cross-section view of a waveguide 300. The example waveguide 300 is formed with a top portion 302 and a bottom portion 304. The top portion 302 and a bottom portion 304 are coupled at seam 306. The waveguide includes a cavity 308. Within cavity 308, electromagnetic energy propagates during the operation of waveguide 300. The waveguide 300 may also include a feed 309. Feed 309 can be used to provide electromagnetic energy to cavity 308 in waveguide 300. Alternatively or additionally, feed 309 may be used to allow electromagnetic energy to leave waveguide 300. The example waveguide 300 of FIG. 3A features seam 306 at the middle point of the height of cavity 308. In various embodiments, the top portion 302 and a bottom portion 304 may be coupled together at various different positions along an axis of the waveguide.

Figure 3B:
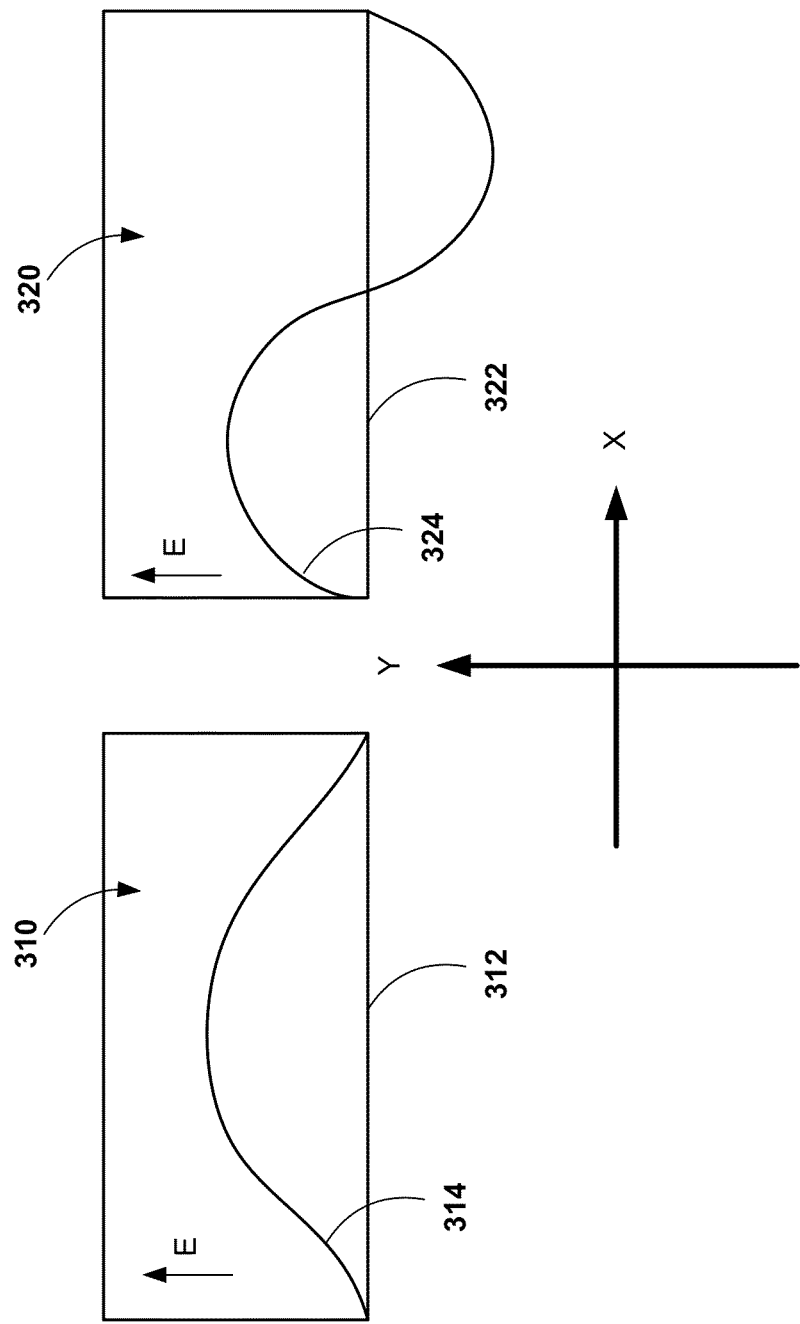
FIG. 3B illustrates two examples of modes operating in waveguides.

FIG. 3B illustrates two examples of modes operating in waveguides. Mode 310 is an example of a $TE_{10}$ mode operating in a cross section of metallic waveguide 312. Mode 320 is an example $TE_{20}$ mode operating in a cross section of metallic waveguide 322. Mode 310 and Mode 320 each have respective electromagnetic energy propagating down the length of the waveguide. As shown in FIG. 3A, the electromagnetic energy will propagate through the respective waveguides in a direction either in-to or out-of the page (i.e. along the Z-axis).

Because the example waveguide 312 and waveguide 322 are metallic, each has a similar set of boundary conditions. The boundary conditions result from specific physical phenomena that occur due to physics and the materials that form the waveguide. For example, in the metallic waveguide, assuming the waveguide walls are nearly perfectly conducting, the boundary conditions require that there be no tangential electric field at any of the wall sides. Therefore, when a TE mode is conducted by the waveguide, there cannot be an electric field at the location of a wall of the waveguide (where the wall is in the same direction as the electric field).

As shown in FIG. 3B, the example electric field of the electromagnetic energy is pointed in the vertical direction. Due to the boundary conditions, there cannot be any vertically oriented electric field at the vertical walls of the waveguide. Therefore, for any propagation mode of electromagnetic energy to exist in the waveguide, the electric field cannot have any value other than zero in the vertical direction at the walls of the waveguide.

Waveguide 310 is an example of a $TE_{10}$ mode operating in a cross section of metallic waveguide 312. As previously discussed, the suffix 10 indicates the waveguide dimension is equal to one-half of the wavelength of the electromagnetic energy along the width of waveguide 310. However, the suffix number of zero indicates there is not a variation of the field with respect to the vertical direction. Because all TE modes have a magnetic field that is transverse (i.e. perpendicular) to the direction of propagation of the electromagnetic energy, and the energy is propagating either in to or out of the page, the electric field of mode 310 is completely in the vertical direction. Curve 314 indicated the relative electric field strength of mode 310 as a function of horizontal position in waveguide 312. As was already discussed with the boundary conditions, the electric field of mode 310 goes to zero at the edges of the waveguide 312. Further, the electric field of mode 310 has a maximum in the center of the waveguide 312.

As previously discussed, at the point along the surface of the waveguide 312 that corresponds to the position where the electric field is a maximum, the current induced in the waveguide 312 is at a minimum. However, at the point along the surface of the waveguide 312 that corresponds to the position where the electric field is a minimum, the current induced in the waveguide 312 is at a maximum.

Mode 320 is an example $TE_{20}$ mode operating in a cross section of metallic waveguide 322. The suffix 20 indicates the waveguide dimension is equal to a full wavelength (i.e. two half wavelengths) of the wavelength of the electromagnetic energy along the width of waveguide 322 and the zero indicates there is no variation of the field with respect to the vertical direction. Curve 324 indicated the relative electric field strength of mode 320 as a function of horizontal position in the waveguide 322. As was already discussed with the boundary conditions, the electric field of mode 320 goes to zero at the edges of the waveguide 322. Additionally, the electric field of mode 320 is equal to zero at the middle point of the X-axis. Further, the absolute value of the electric field of mode 320 has two maxima in waveguide 322, a maximum at one-quarter of the width and a maximum at three quarters of the width of waveguide 312. As indicated by curve 324, the electric field will have different signs at these two absolute maxima (one being positive and the other being negative), however the positive and negative maxima may change positions with each other depending on the specific embodiment.

FIG. 3B presents a $TE_{10}$ and a $TE_{20}$ mode. However, the systems and methods disclosed herein, may work with other modes of electromagnetic propagation as well. For example, $TE_{01}$ and a $TE_{02}$ modes would operate virtually identically to $TE_{10}$ and a $TE_{20}$ modes, except for being rotated 90 degrees (i.e. the electric field would be horizontally aligned rather than vertically). Further, higher order modes, such as $TE_{30}$ and a $TE_{21}$ may be used as well. Additionally, TM may also be used with the systems and methods disclosed herein. For simplicity, each mode is not shown in a figure.

FIG. 3C illustrates two additional examples of modes operating in waveguides. Waveguide 330 has a conventional construction, while waveguide 340 has a split-block construction. The waveguide 330 has a top surface 332 that is coupled to a bottom surface 334. The bottom surface 334 features a waveguide cavity that includes the full height dimension of the waveguide. Once the top surface 332 is coupled to the bottom surface 334 at seam 338, the waveguide 330 is formed.

The waveguide 340 has a top surface 342 that is coupled to a bottom surface 344. The bottom surface 344 features a waveguide cavity that includes half the height dimension of the waveguide. The top surface 342 features a waveguide cavity that includes half the height dimension of the waveguide. Once the top surface 342 is coupled to the bottom surface 344 at seam 348, the waveguide 330 with a full height is formed.

Waveguide 330 may conduct representative electromagnetic energy 336. As shown in FIG. 3C, waveguide 330 may conduct representative electromagnetic energy 336 in the $TE_{01}$ mode. Waveguide 340 may conduct representative electromagnetic energy 346. As shown in FIG. 3C, waveguide 340 may conduct representative electromagnetic energy 346 in the $TE_{01}$ mode. While operating in the $TE_{01}$ mode, the waveguides are operating in a similar mode to waveguide 310 of FIG. 3B. The electric field of the TE01 mode in waveguides 330 and 340 are rotated 90 degrees compared to the electric field of waveguide 310 of FIG. 3B.

As previously discussed, at the point along the surface of the waveguide that corresponds to the position where the electric field is a maximum, the current induced in the waveguide is at a minimum. Similarly, at the point along the surface of the waveguide that corresponds to the position where the electric field is a minimum, the current induced in the waveguide is at a maximum. In waveguide 330, the current induced in the waveguide is at a minimum halfway up the Y-axis of the waveguide and the current induced in the waveguide is at a maximum at the top and bottom of the Y-axis of the waveguide. In waveguide 330, one of the two the maximum current positions corresponds to the seam 338. Disturbances in the waveguide at this high current point may have a significant effect on the propagation of the electromagnetic energy. Therefore, when the seam is formed, it may require precision machining. Alternatively, if the seam is not precise and causes a disturbance, the waveguide 330 may not perform exactly as designed. The radar system will need to have a compensation introduced to correct for the defect introduced by the disturbance of the seam.

In waveguide 340, the current induced in the waveguide is at a minimum halfway up the Y-axis of the waveguide and the current induced in the waveguide is at a maximum at the top and bottom of the Y-axis of the waveguide. In waveguide 340, neither of the two the maximum current positions corresponds to the seam 348. The seam 348 is located at a low-current position within the waveguide. Thus, the seam 348 may not cause much of a disturbance with the propagation of electromagnetic energy in the waveguide. Because the seam 348 will have little or no impact on the propagation of electromagnetic energy in the waveguide 340, waveguide 340 may be constructed with larger tolerances than waveguide 330. Therefore, the machining required to produce waveguide 340 is less intensive than that required to produce wave guide 330.

Figure 3D:
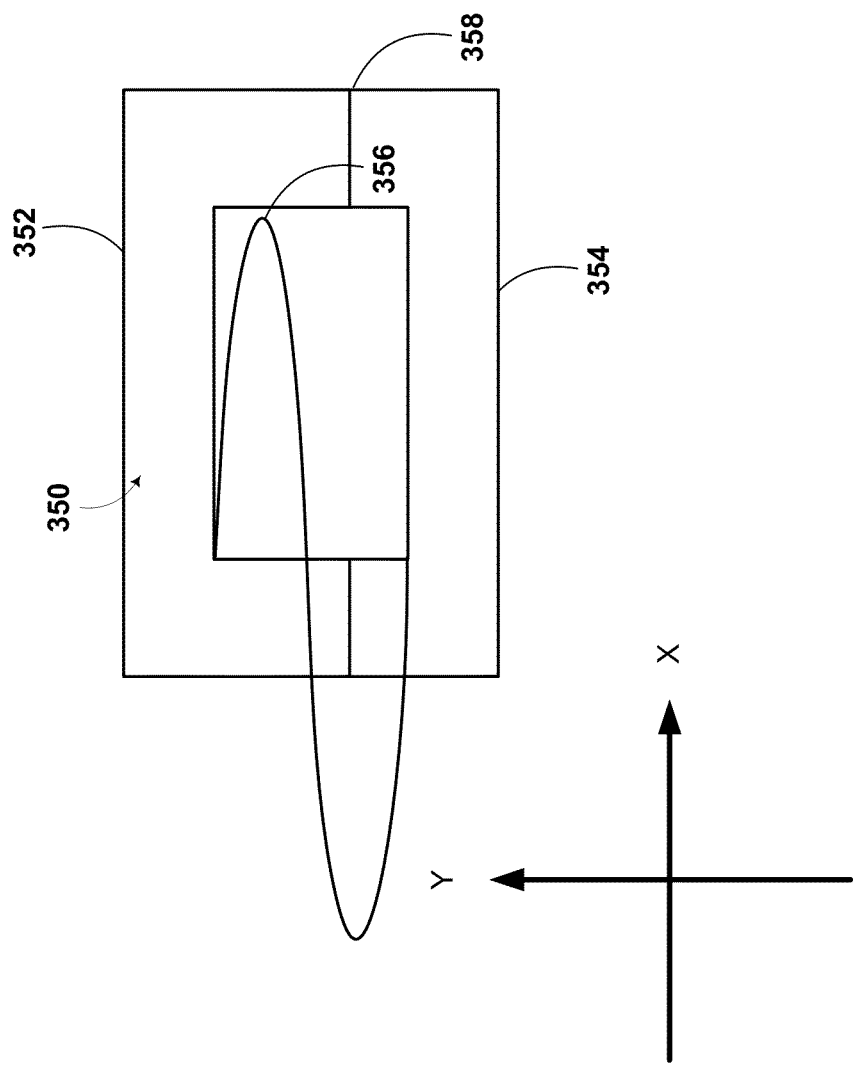
FIG. 3D illustrates another example of mode operating in a waveguide.

FIG. 3D illustrates another example of mode operating in a waveguide. Waveguide 350 features an embodiment of a split-block construction of waveguide channels for radar frontend. The waveguide 350 has a top surface 352 that is coupled to a bottom surface 354. The bottom surface 354 features a waveguide cavity that includes one quarter of the height dimension of the waveguide. The top surface 352 features a waveguide cavity that includes three quarter of the height dimension of the waveguide. Once the top surface 352 is coupled to the bottom surface 354 at seam 358, the waveguide 350 with a full height is formed.

Waveguide 350 may conduct representative electromagnetic energy 356. As shown in FIG. 3C, waveguide 350 may conduct representative electromagnetic energy 356 in the $TE_{02}$ mode. While operating in the $TE_{02}$ mode, the waveguides are operating in a similar mode to waveguide 320 of FIG. 3B. The electric field of the $TE_{02}$ mode in waveguide 350 is rotated 90 degrees compared to the electric field of waveguide 320 of FIG. 3B.

In waveguide 350, the current induced in the waveguide is at a minimum one quarter of the way up the Y-axis of the waveguide and at three quarter of the way up the Y-axis of the waveguide. The current induced in the waveguide is at a maximum at the top and bottom of the Y-axis of the waveguide and also in the middle of the Y-axis of the waveguide. In waveguide 350, none of the three maximum current positions corresponds to the seam 358. Instead, the seam 358 is located at a low-current position within the waveguide. Thus, the seam 358 may not cause much of a disturbance with the propagation of electromagnetic energy in the waveguide. Because the seam 358 will have little or no impact on the propagation of electromagnetic energy in the waveguide 350, waveguide 350 may be constructed with larger tolerances than waveguide 330. Therefore, the machining required to produce waveguide 350 is less intensive than that required to produce waveguide 330.

Figure 3E:
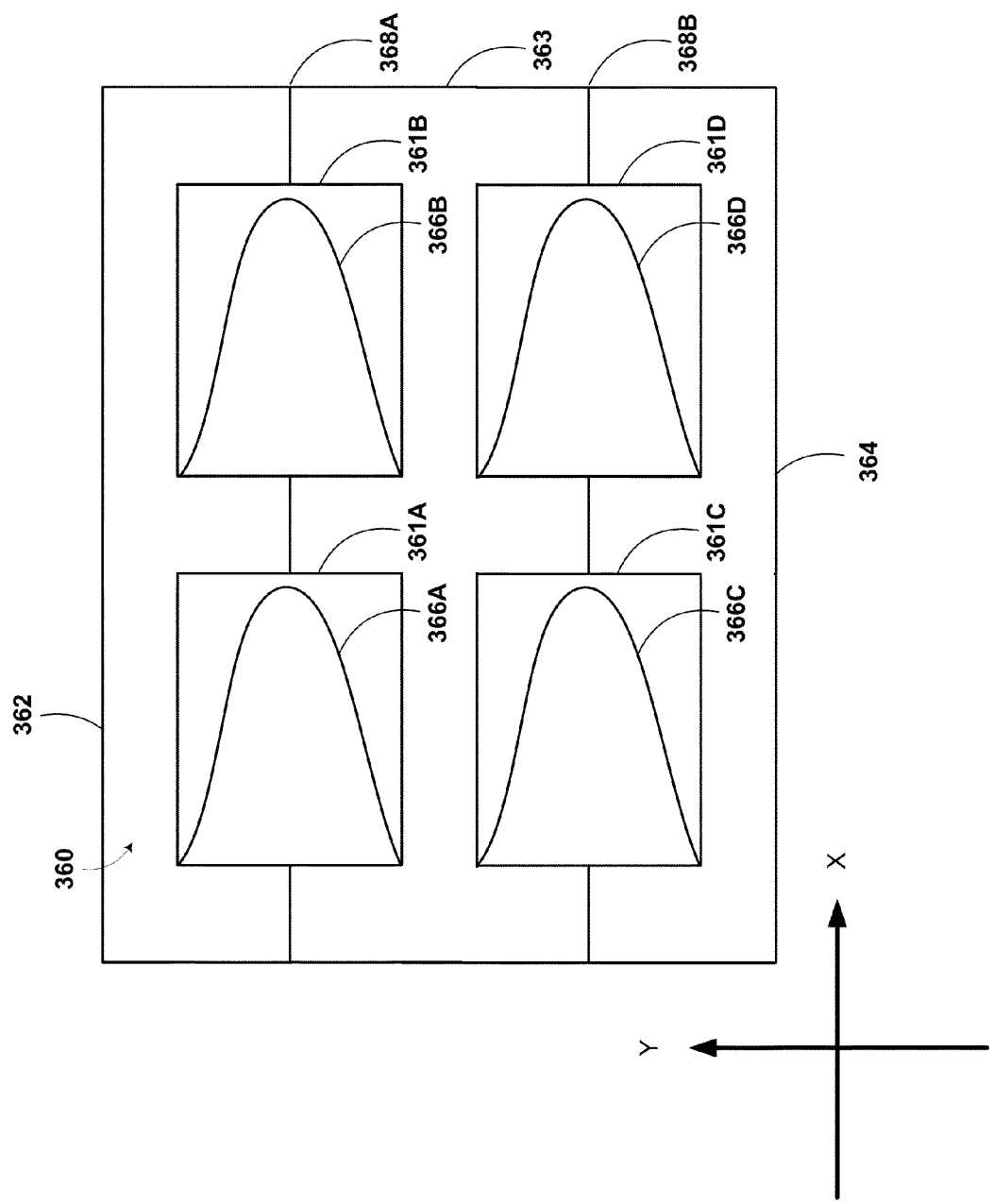
FIG. 3E illustrates a waveguide with multiple cavities.

FIG. 3E illustrates a waveguide with multiple cavities 361A, 361B, 361C, and 361D. Waveguide 360 has a split-block construction. The waveguide 360 has a top surface 362 that is coupled to a middle surface 363. The middle surface 363 is also coupled to a bottom surface 364. The bottom surface 364 defines one half of the height dimension of cavities 361C and 361D. The top surface 362 defines one half of the height dimension of cavities 361A and 361B. The middle surface 363 defines one half of the height dimension of each of cavities 361A-361D. Once the top surface 362 is coupled to the middle surface 363 at seam 368A, the full height of cavities 361A and 361B is defined. Once the middle surface 363 is coupled to the bottom surface 364 at seam 368B, the full height of cavities 361C and 361D is defined.

Waveguide 360 shows how the top surface 362, a middle surface 363, and the bottom surface 364 can be machined to form cavities 361A-361D. Cavities 361A, 361B, 361C, and 361D may conduct electromagnetic energy in respective modes 366A, 366B, 366C, and 366D down the length of the waveguide. Cavities 361A and 361B are intersected by a common plane defined by seam 368A. Cavities 361C and 361D are intersected by a common plane defined by a seam 368B. It is beneficial for the seam to define a common plane for a respective set of cavities, as each cavity in the set can then operate in the same mode and have minimum distortions introduced by the respective seam. Additionally, by altering the dimensions of waveguide 360, a multi-cavity waveguide may be formed that supports modes other than those shown in FIG. 3E.

As shown in FIG. 3E, the waveguide 360 features four cavities. However, more cavities can be added in either a plane defined by a seam, or by adding another layer to the waveguide 360. As a new layer is added to the waveguide, a new set of cavities with a respective seam defining the plane is created.

3. Example Methods

Figure 4:
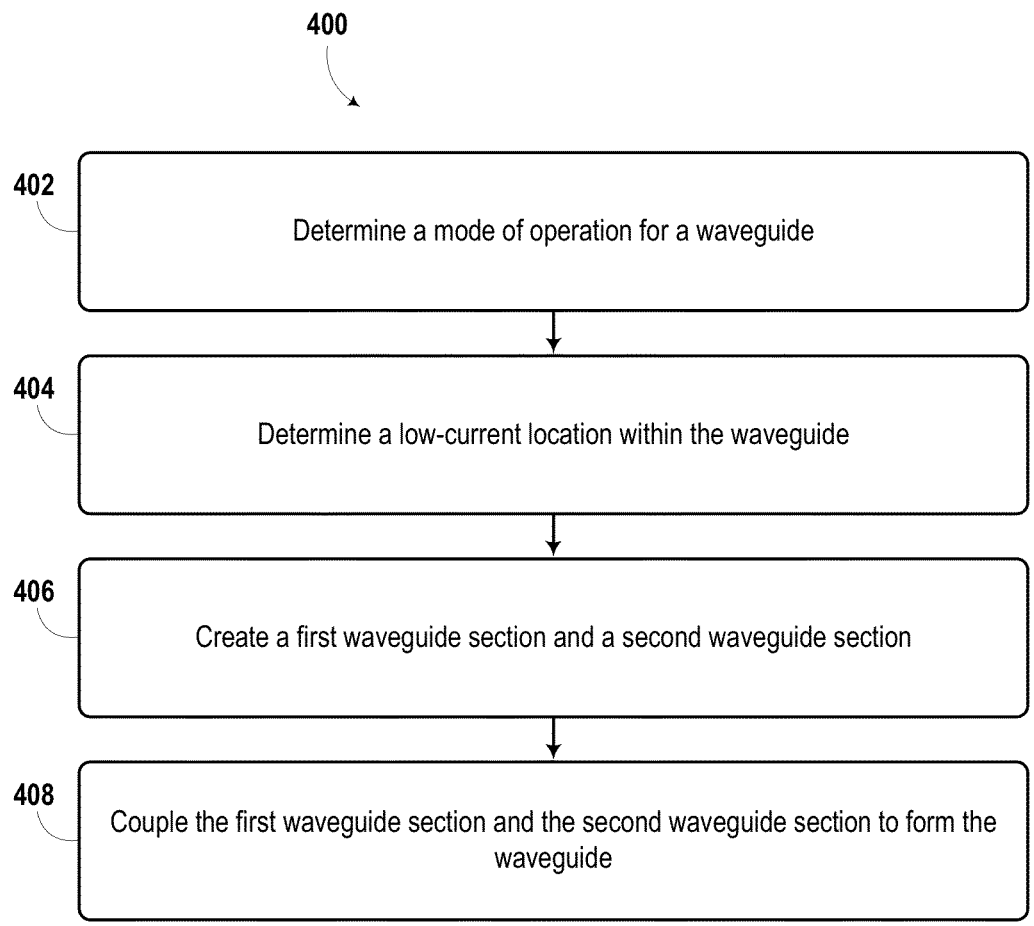
FIG. 4 illustrates an example method for creating a split-block waveguide channel for a radar frontend.

A method 400 is provided for creating a split-block waveguide channel for a radar frontend. The method could be performed to create waveguides similar to those shown in FIGS. 3A-3E and described above; however, other waveguide could be created as well. FIG. 4 illustrates the blocks in an example method for creating a split-block waveguide channel for a radar frontend. However, it is understood that in other embodiments, the blocks may appear in different order and blocks could be added, subtracted, or modified. Additionally, the blocks may be performed in a linear manner (as shown) or may be performed in a parallel manner (not shown).

Block 402 includes determining the mode of operation of a waveguide. As previously discussed, Maxwell's Equations define several modes of operation for any given waveguide. Each mode defines one specific way electromagnetic energy propagates through the waveguide. When a waveguide is designed, by properly selecting both (i) waveguide dimensions and (ii) frequency of operation, electromagnetic energy may propagate through the waveguide in a specific mode. Often, waveguides are designed so only one propagation mode is supported at the design frequency.

A waveguide designer may choose one of the four main types of waveguide propagation modes, TE modes, TM modes, TEM modes, and Hybrid modes in which the waveguide will operate. The suffix numbers of the chosen mode indicate the respective number of half-wavelengths of the electromagnetic energy equal to the width and height of the waveguide. However, a suffix number of zero indicates there is not a variation of the field with respect to that direction. For example, a $TE_{10}$ mode indicates the waveguide is a half-wavelength in width and there is no field variation in the height direction. Typically, when the suffix number is equal to zero, the dimension of the waveguide in the respective direction is less than one-half of a wavelength.

Generally, but not exclusively, the waveguides disclosed herein will be operated in the $TE_{10}$ mode or the $TE_{01}$ mode. When operating a waveguide in a TE mode, the suffix numbers also indicate the number of field-maximums along the respective direction of the waveguide. For example, a $TE_{10}$ mode indicates the waveguide has one electric field maximum in the in width and there zero maxima in the height. Thus, based on these criteria, a waveguide designer can determine a desired mode of operation for the waveguide.

Block 404 includes determining a low surface current location within a waveguide. Based on the mode of operation of the waveguide, and the dimensions of the waveguide, a low surface current location within the waveguide can be determined. As previously discussed, at the point along the surface of the waveguide that corresponds to the position where the electric field is a maximum, the current induced in the waveguide is at a minimum. In a $TE_{01}$ or $TE_{10}$ mode, the low-current position corresponds to the mid-point in the direction in which the electric field varies. For example, in waveguide 330, the current induced in the waveguide is at a minimum half way up the Y-axis of the waveguide. However, in a $TE_{02}$ or $TE_{20}$ mode, the low-current position corresponds to both the one-quarter and the three-quarter length of the dimension in the direction in which the electric field varies. Thus, the number of low-current positions is equal to the number of the mode for TE modes.

Block 406 includes creating a first waveguide section and a second waveguide section. At block 402, a mode of operation for a waveguide was determined. Determining the mode of operation of the waveguide included determining dimensions of the waveguide as well. Further, block 404 included determining a low-current position within the waveguide. Based on the dimensions for the waveguide calculated at block 402 and the low-current position determined at block 404, the full dimensions of each portion of the waveguide are known.

The first waveguide section is created such that the height of the first section corresponds to a low-current position within the waveguide. The second waveguide section is created such that the height of the second section is equal to the total required waveguide height, minus the height of the first section. In some embodiments, the dimension used may be a width of the waveguide, rather than the height of the waveguide. Further, in other embodiments, the dimension of the second waveguide may be determined first, and the dimension of the first waveguide may be calculated based on the second waveguide dimension. In yet further embodiments, the height of both the first and second sections may be determined at block 404 when the low-current position within the waveguide is determined. In multiple-layer embodiments, block 406 may include creating a third waveguide section as well. Any one of the first, second, or third waveguide section may be the middle waveguide section. The middle waveguide section (as shown in FIG. 3E) features portions of waveguide cavities on both surfaces.

Block 408 includes coupling the first waveguide section and the second waveguide section. After each waveguide section is created at block 406, the sections are coupled together at block 408. Coupling of the waveguide sections can be performed in various depending on the embodiment. In some embodiments, the sections are physically coupled. Physical coupling may include bonding the sections of the waveguide to each other. The physical coupling may be performed by welding the two sections together. Welding may be accomplished by heating the two sections or other form of welding. In other embodiments, the waveguide sections may be coupled by simply being brought in contact with each other. After the two sections are brought in contract with each other, an external means may be used to hold the two sections coupled in contact with each other. In yet further embodiments, various other means may be used to couple the waveguide sections. For example, the waveguide sections may be coupled with a conductive adhesive.

Figure 5:
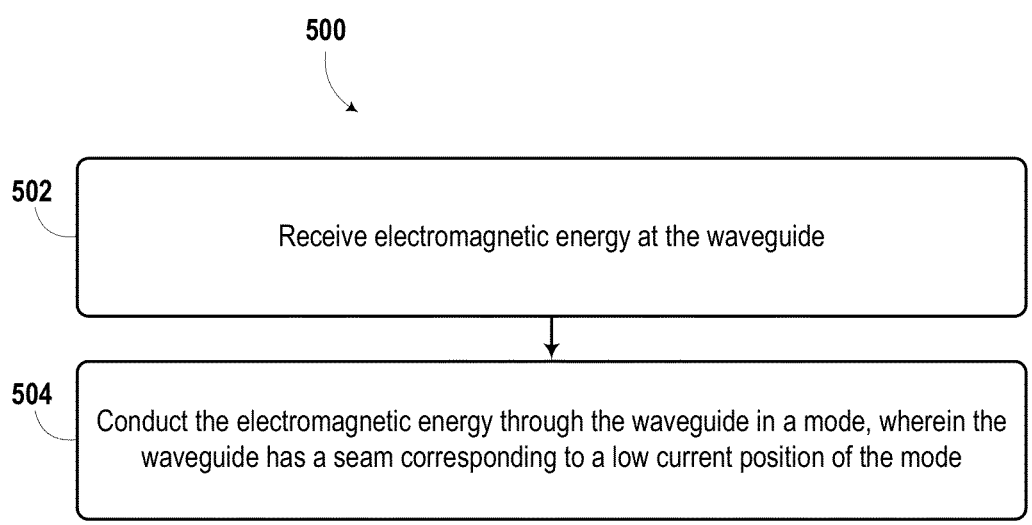
FIG. 5 illustrates an example method for operating a split-block waveguide channel for a radar frontend.

A method 500 is provided for operating a split-block waveguide channel for a radar frontend. The method could be performed with waveguides similar to those shown in FIGS. 3A-3E and described above; however, other waveguide could be used as well. FIG. 5 illustrates the blocks in an example method for operating a split-block waveguide channel for a radar frontend. However, it is understood that in other embodiments, the blocks may appear in different order and blocks could be added, subtracted, or modified. Additionally, the blocks may be performed in a linear manner (as shown) or may be performed in a parallel manner (not shown).

Block 502 includes receiving electromagnetic energy at the waveguide. Electromagnetic energy is received by the waveguide by a feed (such as feed 309 of FIG. 3A). In some embodiments, a feed provides an input signal input to a waveguide from a radio system, where the signal is provided in the form of electromagnetic energy. In other embodiments, the feed may be used to couple electromagnetic energy into the waveguide from an external environment. For example, when the waveguide may is coupled to an antenna, when the antenna receives a signal, it propagates into the waveguide.

Block 504 includes conducting the electromagnetic energy through the waveguide in a mode. Additionally, the waveguide has a seam corresponding to a low current position of the mode. As previously discussed, electromagnetic energy propagates (i.e. is conducted) through waveguide in at least one mode. At block 504, electromagnetic energy is conducted in a mode that corresponds to having a low-current position at the location of the waveguide seam. Based on the frequency of the electromagnetic energy, a waveguide can be designed that has the dimensions of the waveguide corresponding to a seam at the low surface current location. By conducting electromagnetic energy in a way that has the low-current position at the seam, distortions introduced to the electromagnetic energy can be minimized.

For a waveguide to be used, it typically will have both a way to get electromagnetic energy in to the waveguide as well as a way to remove electromagnetic energy. In some systems, each feed may be dual purpose. For example, a first feed may be used to inject a signal made of electromagnetic energy into the waveguide. This electromagnetic energy propagates through the waveguide to a second feed. At the second feed, the electromagnetic energy leaves the waveguide. The second feed may be coupled to an antenna where the signal, in the form of electromagnetic energy, is transmitted. Additionally, the antenna may receive signals in the form of electromagnetic energy from the environment. The antenna may couple this received electromagnetic energy into the waveguide via the second feed. This electromagnetic energy propagates through the waveguide to the first feed. The electromagnetic energy may leave the waveguide at the first feed for processing by a radio receiver.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A waveguide comprising:
   a first waveguide section;
   a second waveguide section;
   a feed configured to couple electromagnetic energy to or from a waveguide cavity, wherein the electromagnetic energy has a frequency corresponding to a propagation mode of the electromagnetic energy in the waveguide cavity; and
   a seam between the first waveguide section and the second waveguide section, wherein the first waveguide section and the second waveguide section form the waveguide cavity, and wherein the seam corresponds to a low surface current location of the propagation mode of the waveguide.

2. The waveguide of claim 1, wherein the propagation mode is a transverse electric propagation mode.

3. The waveguide of claim 1, wherein the propagation mode is a transverse magnetic propagation mode.

4. The waveguide of claim 1, wherein the seam is formed where the first waveguide section is coupled to the second waveguide section.

5. The waveguide of claim 1, wherein the first waveguide section and the second waveguide section each have a respective height.

6. The waveguide of claim 5, wherein the height of the first waveguide section is equal to the height of the second waveguide section.

7. The waveguide of claim 5, wherein the height of the first waveguide section is equal to two times the height of the second waveguide section.

8. The waveguide of claim 5, wherein the height of the first waveguide section is equal to one half the height of the second waveguide section.

9. The waveguide of claim 1, further comprising more than one cavity.

10. The waveguide of claim 9, wherein each cavity of the more than one cavity on a plane.

11. The waveguide of claim 10, wherein the plane is defined by the seam.

12. A method for creating a waveguide comprising:
determining a mode of operation for a waveguide;
determining a low surface current location within the waveguide, wherein the low surface current location is based on both the mode of operation of the waveguide and a dimension of the waveguide;
creating a first waveguide section and a second waveguide section;
creating a feed configured to couple electromagnetic energy to or from a waveguide cavity, wherein the electromagnetic energy has a frequency corresponding to a propagation mode of the electromagnetic energy in the waveguide cavity; and
coupling the first waveguide section and the second waveguide section to form the waveguide cavity with the dimension such that the first waveguide section and second waveguide section are in contact at the low surface current location of the propagation mode of the electromagnetic energy in the waveguide cavity.

13. The method of claim 12, wherein the propagation mode is a transverse electric propagation mode.

14. The method of claim 12, wherein the propagation mode is a transverse magnetic propagation mode.

15. The method of claim 12, wherein the dimension of the waveguide is equal to a sum of a height of the second waveguide section plus a height of the first waveguide section.

16. The method of claim 15, wherein the height of the first waveguide section is equal to the height of the second waveguide section.

17. A method of operating a waveguide comprising:
receiving electromagnetic energy at the waveguide, wherein the electromagnetic energy has a frequency corresponding to a propagation mode of the electromagnetic energy in the waveguide cavity; and
conducting the electromagnetic energy through the waveguide cavity in the propagation mode, wherein the waveguide has a seam corresponding to a low current position of the propagation mode.

18. The method of claim 17, wherein the waveguide comprises a first waveguide second and a second waveguide section coupled together at the waveguide seam.

* * * * *